(12) United States Patent
Orady et al.

(10) Patent No.: US 10,987,565 B2
(45) Date of Patent: Apr. 27, 2021

(54) EXERCISE MACHINE EMERGENCY MOTOR STOP

(71) Applicant: Tonal Systems, Inc., San Francisco, CA (US)

(72) Inventors: Aly E. Orady, San Francisco, CA (US); Thomas Kroman Watt, San Francisco, CA (US)

(73) Assignee: Tonal Systems, Inc., San Francisco, CA (US)

( * ) Notice: Subject to any disclaimer, the term of this patent is extended or adjusted under 35 U.S.C. 154(b) by 22 days.

(21) Appl. No.: 16/534,897

(22) Filed: Aug. 7, 2019

(65) Prior Publication Data

US 2020/0070032 A1    Mar. 5, 2020

Related U.S. Application Data

(60) Provisional application No. 62/716,862, filed on Aug. 9, 2018.

(51) Int. Cl.
| | | |
|---|---|---|
| *A63B 71/00* | (2006.01) | |
| *A63B 24/00* | (2006.01) | |
| *A63B 21/005* | (2006.01) | |

(52) U.S. Cl.
CPC ...... *A63B 71/0054* (2013.01); *A63B 21/0058* (2013.01); *A63B 24/0087* (2013.01); *A63B 2071/0081* (2013.01); *A63B 2220/40* (2013.01)

(58) Field of Classification Search
CPC ............ A63B 71/0054; A63B 24/0087; A63B 21/0058; A63B 2071/0081; A63B 2220/40; A63B 21/153; A63B 23/03541; A63B 21/4035; A63B 21/157; A63B 21/156; A63B 2220/16; A63B 2220/72; A63B 2220/805; A63B 2220/89; A63B 2220/833; A63B 2071/0627; A63B 2225/20; A63B 2225/15; A63B 21/0057; A63B 21/4043

See application file for complete search history.

(56) References Cited

U.S. PATENT DOCUMENTS

| | | | | |
|---|---|---|---|---|
| 3,592,466 | A * | 7/1971 | Parsons | A63B 22/04 482/53 |
| 4,496,147 | A * | 1/1985 | DeCloux | A63B 21/0083 482/113 |
| 4,635,927 | A * | 1/1987 | Shu | A63B 22/025 318/376 |
| 4,708,338 | A * | 11/1987 | Potts | A63B 21/023 482/52 |
| 4,726,581 | A * | 2/1988 | Chang | A63B 22/04 482/113 |
| 4,934,694 | A * | 6/1990 | McIntosh | A63B 24/00 482/137 |
| 5,139,470 | A * | 8/1992 | Wang | A63B 21/0083 482/113 |

(Continued)

FOREIGN PATENT DOCUMENTS

WO        9510135        4/1995

*Primary Examiner* — Garrett K Atkinson
(74) *Attorney, Agent, or Firm* — Van Pelt, Yi & James LLP

(57) ABSTRACT

A safety signal is sent to a relay coupled to a plurality of power leads of a motor wherein a default state of the relay is to short the plurality of power leads together and wherein the safety signal maintains the relay in an open state. The safety signal to the relay is deasserted in response to a determination that an unsafe condition has occurred.

21 Claims, 12 Drawing Sheets

(56) References Cited

U.S. PATENT DOCUMENTS

| | | | | |
|---|---|---|---|---|
| 5,207,621 A * | 5/1993 | Koch | A63B 22/0056 | 482/112 |
| 5,242,341 A * | 9/1993 | Yeh | A63B 22/04 | 482/52 |
| 5,403,252 A * | 4/1995 | Leon | A61B 5/221 | 482/5 |
| 5,431,609 A * | 7/1995 | Panagiotopoulos | A63B 21/00181 | 482/5 |
| 5,769,759 A * | 6/1998 | Alter | A63B 22/04 | 482/37 |
| 6,036,622 A * | 3/2000 | Gordon | A63B 21/154 | 482/51 |
| 6,042,513 A * | 3/2000 | Koteles | A63B 24/00 | 318/1 |
| 7,594,877 B2 * | 9/2009 | Anderson | A63B 21/154 | 482/51 |
| 7,815,549 B2 * | 10/2010 | Crawford | A63B 24/00 | 482/52 |
| 7,887,464 B1 * | 2/2011 | Jones | A61H 1/0214 | 482/51 |
| 7,927,257 B2 * | 4/2011 | Patel | A63B 23/0405 | 482/52 |
| 8,277,366 B2 * | 10/2012 | Savane | A63B 22/0056 | 482/52 |
| 8,702,571 B2 * | 4/2014 | Fenster | A63B 22/04 | 482/52 |
| 8,974,353 B2 * | 3/2015 | Fenster | A63B 22/04 | 482/52 |
| 9,216,317 B2 * | 12/2015 | Golen, Jr. | A63B 21/0059 | |
| 9,238,158 B2 * | 1/2016 | Strommen | A63B 21/0057 | |
| 9,370,680 B1 * | 6/2016 | Macaulay | A63B 21/0552 | |
| 9,789,355 B1 * | 10/2017 | Lo | A63B 24/0087 | |
| 9,993,682 B2 * | 6/2018 | Johnson | A47J 36/32 | |
| 10,105,568 B2 * | 10/2018 | Golen, Jr. | A63B 21/0058 | |
| RE47,331 E * | 4/2019 | Fenster | A63B 22/04 | |
| 2010/0099541 A1 * | 4/2010 | Patel | A63B 21/00181 | 482/52 |
| 2011/0086742 A1 * | 4/2011 | Burnfield | A63B 21/00181 | 482/7 |
| 2011/0177917 A1 * | 7/2011 | Patel | A63B 23/0405 | 482/52 |
| 2012/0238409 A1 * | 9/2012 | Halsey | A63B 71/0619 | 482/52 |
| 2012/0264572 A1 * | 10/2012 | Fenster | A63B 21/0051 | 482/52 |
| 2014/0038777 A1 * | 2/2014 | Bird | A63B 21/156 | 482/5 |
| 2015/0165263 A1 * | 6/2015 | Golen, Jr. | A63B 21/0058 | 482/7 |
| 2015/0190671 A1 * | 7/2015 | Golen, Jr. | A63B 21/0059 | 482/52 |
| 2016/0016026 A1 * | 1/2016 | Salas Peralta | A63B 21/0083 | 482/5 |
| 2019/0022455 A1 * | 1/2019 | Kueker | A63B 22/04 | |
| 2019/0344112 A1 * | 11/2019 | Phillips | A63B 21/159 | |
| 2020/0047027 A1 * | 2/2020 | Ward | G06F 3/017 | |
| 2020/0047030 A1 | 2/2020 | Ward | | |
| 2020/0047053 A1 | 2/2020 | Ward | | |
| 2020/0047054 A1 | 2/2020 | Ward | | |
| 2020/0047055 A1 | 2/2020 | Ward | | |
| 2020/0054929 A1 | 2/2020 | Ward | | |

* cited by examiner

EXERCISE MACHINE EMERGENCY MOTOR STOP

CROSS REFERENCE TO OTHER APPLICATIONS

This application claims priority to U.S. Provisional Patent Application No. 62/716,862 entitled MACHINE EMERGENCY MOTOR STOP filed Aug. 9, 2018 which is incorporated herein by reference for all purposes.

BACKGROUND OF THE INVENTION

Exercise machines may improve a person's fitness level, by facilitating aerobic exercise, strength training, or both. Examples of aerobic exercises are those which cause significant rises in heart rate and breathing rates and include machines that simulate the movements associated with sports such as running, cycling and rowing. Treadmills, stationary bicycles and rowing machines are generally single purpose machines and are often owned by individuals. Exercise machines, historically maintained as part of professional gyms, are now being purchased and used at an individual's home. Thus, safety is an important element for an exercise machine to prevent injury to man or machine.

BRIEF DESCRIPTION OF THE DRAWINGS

Various embodiments of the invention are disclosed in the following detailed description and the accompanying drawings.

DETAILED DESCRIPTION

Figure 1:
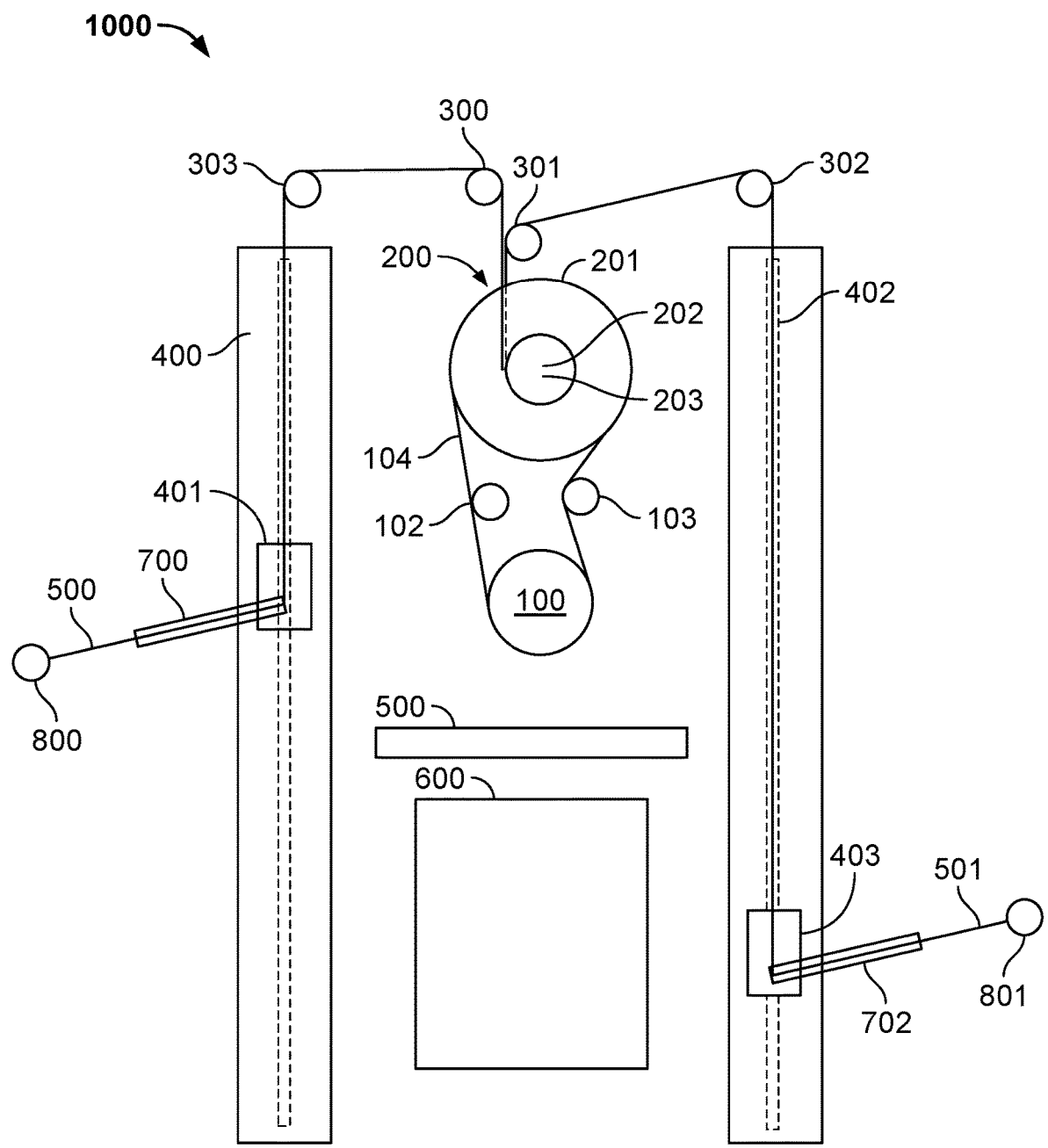
FIG. 1 illustrates a front view of one embodiment of an exercise machine based on a motor.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An exercise machine emergency motor stop is disclosed. An exercise machine has a motor with a plurality of motor leads. A relay is coupled to the plurality of power leads, wherein a default state of the relay is to short the plurality of power leads together and the relay comprises a safety input configured to receive a safety signal to open the relay. By shorting the plurality of power leads together, the motor effectively brakes, reducing the change of injury if the safety signal is not present and/or deasserted. In one embodiment, a safety controller coupled to the safety input. A sensor may be coupled to the safety controller, wherein the safety controller is configured to deassert the safety signal in an event of a sensor detection and/or qualification from the sensor. In one embodiment, the relay comprises a safety input configured to receive a safety signal to maintain the relay in an open state.

Strength training appliances comprise machines that offer resistance and/or load and are used in gymnasia or shared facility exercise rooms. Free weights and systems of pulleys that may be loaded are a common form of load generation used for exercising muscle groups. Systems that use springs or deflecting members may also be used, and because these systems occupy a relatively smaller volume than weight and pulley systems, they may be used in personal spaces such as a home.

Regardless of the loading mechanism, strength training may not normally simulate an activity compared with an aerobic-only machine that mimics a bicycle or road surface. Muscle condition is enhanced by repetitive loading and to reduce the likelihood of injury following a specific program/routine may minimize the risk of mishap. In particular, sudden or "snap" changes in loading may develop an injury event. With spring loaded systems a sudden release of stored energy in the spring system introduces risk to the user. In a system energized by a motor and/or actuator, there is potential for injury because of the availability of kinetic energy beyond that stored as potential energy in the internal magnetic field. In the case of hydraulic drive components, there is a large amount of potential energy stored in pressure vessels as well as any kinetic energy in the pump mechanism. There is thus a need to monitor abnormal operating events such as snap load changes and invoke a controlled and rapid dissipation of stored energy so as to minimize the risk of injury to the user from energy sources routed through the machine. An example of a safety system for an exercise machine based on a motor is described, and without limitation similar techniques may be used for exercise machines based on other energy sources.

REFERENCE DESIGN

FIG. 1 illustrates a front view of one embodiment of an exercise machine based on a motor. An exercise machine (1000) comprises a pancake motor (100), a torque controller (600) coupled to the pancake motor, and a high resolution encoder coupled to the pancake motor (102). As described herein, a "high resolution" encoder is any the encoder is capable of measuring motor position with an accuracy of or better than 30 degrees of electrical rotation. Two cables (500) and (501) are coupled respectively to actuators (800) and (801) on one end of the cables. The two cables (500) and (501) are coupled directly or indirectly on the opposite end to the motor (100). While an induction motor may be used for motor (100), a BLDC motor is a preferred embodiment for its cost, size, weight, and performance. A BLDC motor is more challenging than an induction motor to control torque and so a high resolution encoder assists the system to determine position of the BLDC motor.

Sliders (401) and (403) may be respectively used to guide the cable (500) and (501) respectively along rails (400) and (402). The exercise machine in FIG. 1 translates motor torque into cable tension. As a user pulls on actuators (800) and/or (801), the machine creates/maintains tension on cable (500) and/or (501). The actuators (800, 801) and/or cables (500, 501) may be actuated in tandem or independently of one another.

In one embodiment, electronics bay (600) is included and has the necessary electronics to drive the system. In one embodiment, fan tray (500) is included and has fans that cool the electronics bay (600) and/or motor (100).

Motor (100) is coupled by belt (104) to an encoder (102), an optional belt tensioner (103), and a spool assembly (200). Motor (100) is preferably an out-runner, such that the shaft is fixed and the motor body rotates around that shaft. In one embodiment, motor (100) generates torque in the counter-clockwise direction facing the machine, as in the example in FIG. 1. Referencing an orientation viewing the front of the system, the left side of the belt (104) is under tension, while the right side of the belt is slack. The belt tensioner (103) takes up any slack in the belt. An optical rotary encoder (102) coupled to the tensioned side of the belt (104) captures all motor movement, with significant accuracy because of the belt tension. In one embodiment, the optical rotary encoder (102) is a high resolution encoder. In one embodiment, a toothed belt (104) is used to reduce belt slip. The spools rotate counter-clockwise as they are spooling cable/taking cable in, and clockwise as they are unspooling/releasing cable out.

Spool assembly (200) comprises a front spool (203), rear spool (202), and belt sprocket (201). The spool assembly (200) couples the belt (104) to the belt sprocket (201), and couples the two cables (500) and (501) respectively with front spool (203) and rear spool (202). In one embodiment, a dual motor configuration not shown in FIG. 1 is used to drive each cable (500) and (501). In the example shown in FIG. 1, a single motor (100) is used as a single source of tension, with a plurality of gears configured as a differential are used to allow the two cables/actuators to be operated independently or in tandem. In one embodiment, spools (202) and (203) are directly adjacent to sprocket (201), thereby minimizing the profile of the machine in FIG. 1.

As shown in FIG. 1, two arms (700, 702), two cables (500, 501) and two spools (202, 203) are useful for users with two hands, and the principles disclosed without limitation may be extended to three, four, or more arms (700) for quadrupeds and/or group exercise. In one embodiment, the plurality of cables (500, 501) and spools (202, 203) are driven by one sprocket (201), one belt (104), and one motor (100), and so the machine (1000) combines the pairs of devices associated with each user hand into a single device.

In one embodiment, motor (100) may provide constant tension on cables (500) and (501) despite the fact that each of cables (500) and (501) may move at different speeds. For example, some physical exercises may require use of only one cable at a time. For another example, a user may be stronger on one side of their body than another side, causing differential speed of movement between cables (500) and (501). In one embodiment, a device combining dual cables (500) and (501) for single belt (104) and sprocket (201), may retain a low profile, in order to maintain the compact nature of the machine, which can be mounted on a wall.

In one embodiment, pancake style motor(s) (100), sprocket(s) (201) and spools (202, 203) are manufactured and arranged in such a way that they physically fit together within the same space, thereby maximizing functionality while minimizing profile.

As shown in FIG. 1, spools (202) and (203) are respectively coupled to cables (500) and (501) that are wrapped around the spools. The cables (500) and (501) route through the system to actuators (800) and (801), respectively.

The cables (500) and (501) are respectively positioned in part by the use of "arms" (700) and (702). The arms (700) and (702) provide a framework for which pulleys and/or pivot points may be positioned. The base of arm (700) is at arm slider (401) and the base of arm (702) is at arm slider (403).

The cable (500) for a left arm (700) is attached at one end to actuator (800). The cable routes via arm slider (401) where it engages a pulley as it changes direction, then routes along the axis of rotation of track (400). At the top of track (400), fixed to the frame rather than the track is pulley (303) that orients the cable in the direction of pulley (300), that further orients the cable (500) in the direction of spool (202), wherein the cable (500) is wound around spool (202) and attached to spool (202) at the other end.

Similarly, the cable (501) for a right arm (702) is attached at one end to actuator (601). The cable (501) routes via slider (403) where it engages a pulley as it changes direction, then routes along the axis of rotation of track (402). At the top of the track (402), fixed to the frame rather than the track is pulley (302) that orients the cable in the direction of pulley (301), that further orients the cable in the direction of spool (203), wherein the cable (501) is wound around spool (203) and attached to spool (203) at the other end.

One important use of pulleys (300, 301) is that they permit the respective cables (500, 501) to engage respective spools (202, 203) "straight on" rather than at an angle, wherein "straight on" references being within the plane perpendicular to the axis of rotation of the given spool. If the given cable were engaged at an angle, that cable may bunch up on one side of the given spool rather than being distributed evenly along the given spool.

In the example shown in FIG. 1, pulley (301) is lower than pulley (300). This is not necessary for any functional reason but demonstrates the flexibility of routing cables. In a preferred embodiment, mounting pulley (301) lower leaves clearance for certain design aesthetic elements that make the machine appear to be thinner.

Figure 2:
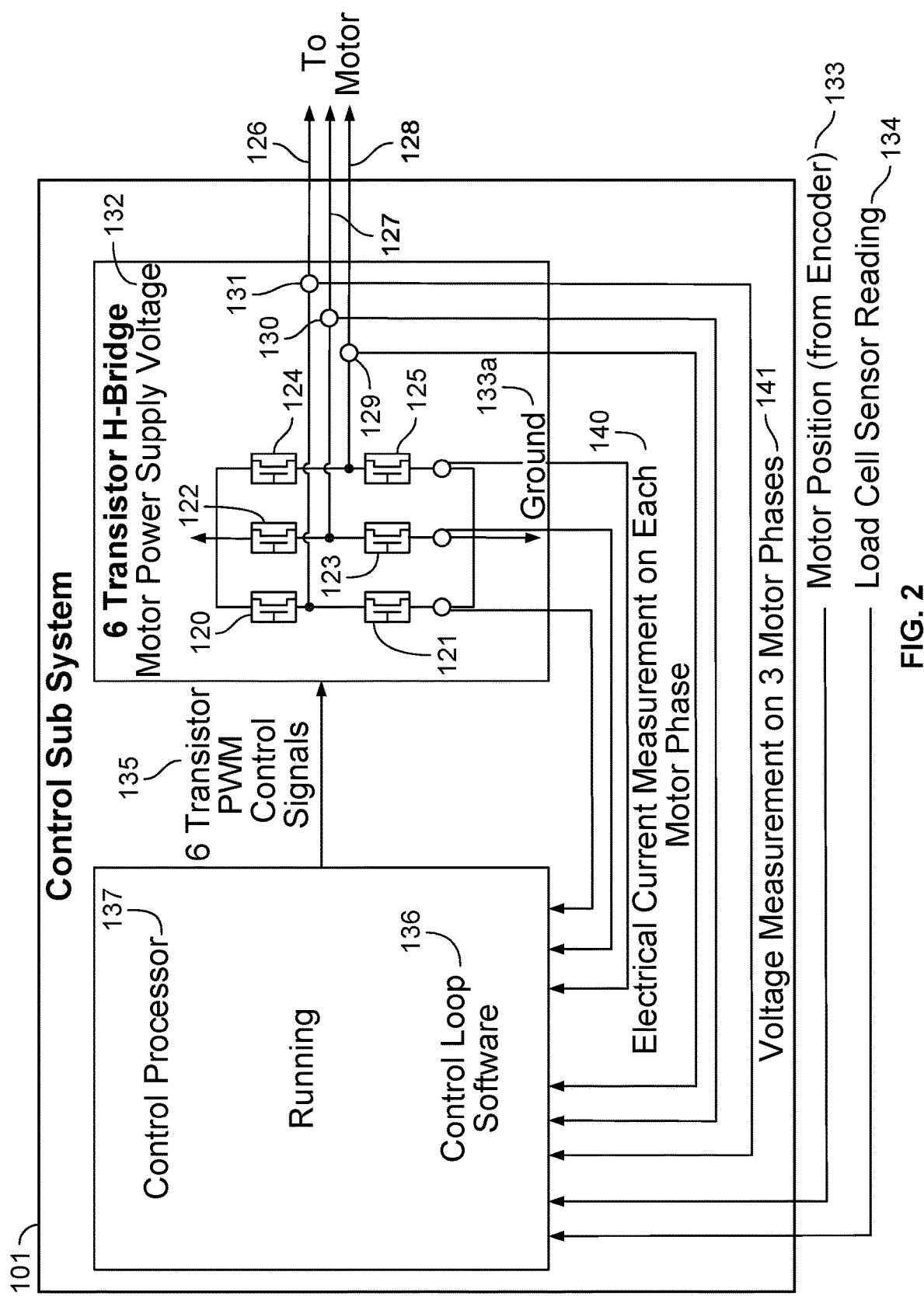
FIG. 2 is a block diagram illustrating an embodiment of a control subsystem for a motor of an exercise machine.

FIG. 2 is a block diagram illustrating an embodiment of a control subsystem for a motor of an exercise machine. In one embodiment, the control subsystem of FIG. 2 is part of controller (600) of FIG. 1. Motor position sensor reading (133), and load cell sensor reading (134) are input to control subsystem (101). Control subsystem (101) drives motor (108) via the three phase control signals (126), (127), and (128), which are the primary inputs into the motor and source of power.

In one embodiment, motor phase control signals (126), (127), and 128 are driven by a standard six-transistor H-Bridge. The H-Bridge comprises transistors (120), (121), (122), (123), (124), and (125); and draws from between motor power supply voltage (132) and ground (133), and is driven by six transistor PWM control signals (135). In one embodiment, the H-Bridge uses electrical current measurement resistors that drive electrical current measurement (140). This may be accomplished by measuring the voltage drop across the resistor, which is directly proportional to the amount of current flowing through the resistor. Because one side of the resistor is grounded, only the supply side of the resistor connected to the transistor need be measured using an ADC. Note that it is only necessary to measure the current flowing on two of the three legs, since the net current flowing in the system is zero. The third may be calculated from the two that are measured.

The voltage on each of the three motor phases at points (129), (130), and (131) are measured using an ADC. These three motor phase voltages (141) may be used to calculate motor position using a position estimator. The six PWM control signals (135) are digital signals driven by a control processor (137), running software to implement a control loop (136). The control processor (137) takes as inputs electrical current measurement on each of the motor phases (140), voltage measurement on each of the motor phases (141), motor position from encoder (133), and load cell sensor reading (134) as inputs. In addition, the processor is coupled to interactive user interface (100).

Voltage Stabilization

Figure 3A:
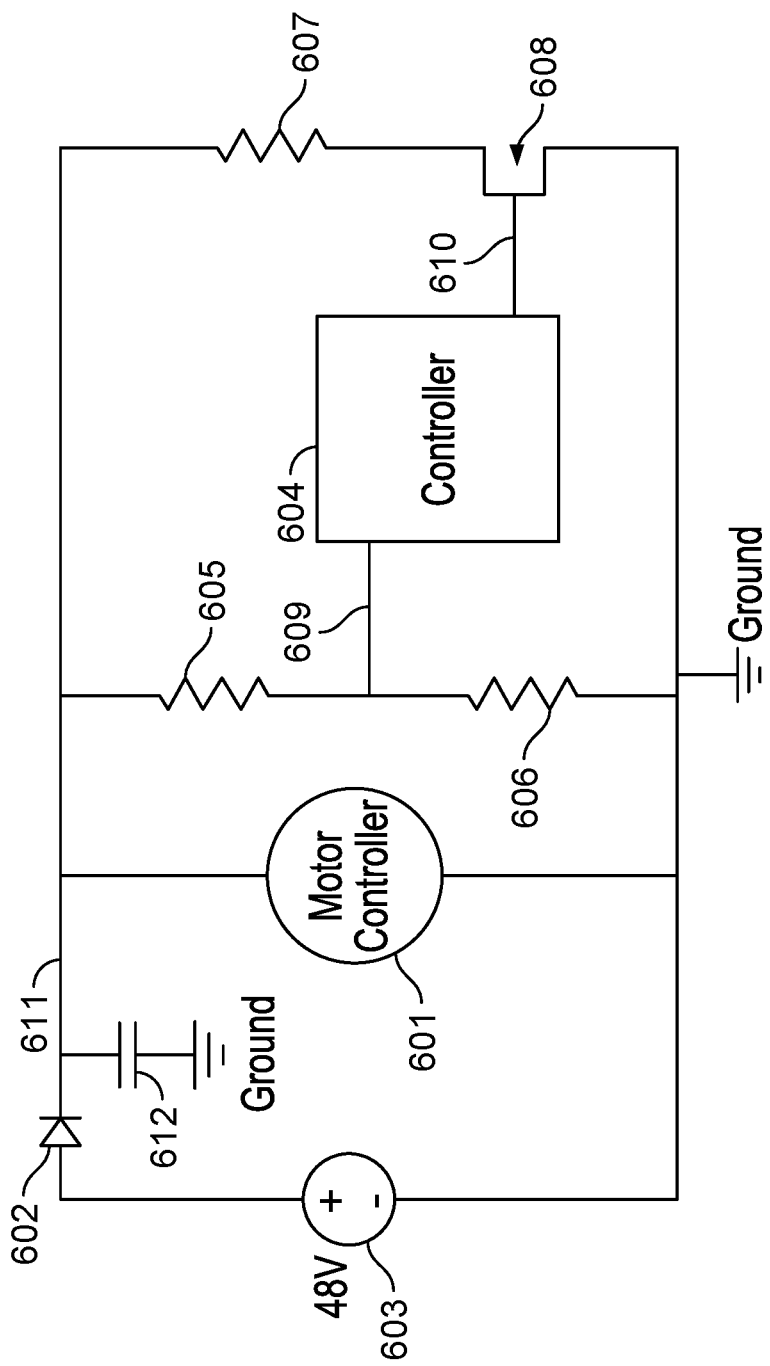
FIG. 3A is a circuit diagram of an embodiment of a voltage stabilizer.

FIG. 3A is a circuit diagram of an embodiment of a voltage stabilizer. In one embodiment, the voltage stabilizer of FIG. 3A is part of controller (600) of FIG. 1. The stabilizer includes a power supply (603) with protective element (602) that provides system power. Such a system may have an intrinsic or by-design capacitance (612). A motor controller (601), which includes the motor control circuits as well as a motor that consumes or generates power is coupled to power supply (603). A controller circuit (604) controls a FET transistor (608) coupled to a high-wattage resistor (607) as a switch to stabilize system power. A sample value for resistor (607) is a 300 W resistor/heater. A resistor divider utilizing a resistor network (605) and (606) is arranged such that the potential at voltage test point (609) is a specific fraction of system voltage (611). When FET (608) is switched on, power is burned through resistor (607). The control signal to the gate of FET (610) switches it on and off. In one embodiment, this control signal is pulse width modulated (PWM) switching on and off at some frequency. By varying the duty cycle and/or percentage of time on versus off, the amount of power dissipated through the resistor (607) may be controlled. Factors to determine a frequency for the PWM include the frequency of the motor controller, the capabilities of the power supply, and the capabilities of the FET. In one embodiment, a value in the range of 15-20 KHz is appropriate.

Controller (604) may be implemented using a microcontroller, micro-processor, discrete digital logic, any programmable gate array, and/or analog logic, for example analog comparators and triangle wave generators. In one embodiment, the same microcontroller that is used to implement the motor controller (601) is also used to implement voltage stabilization controller (604).

In one embodiment, a 48 Volt power supply (603) is used. The system may be thus designed to operate up to a maximum voltage of 60 Volts. In one embodiment, the Controller (604) measures system voltage, and if voltage is below a minimum threshold of 49 Volts, then the PWM has a duty cycle of 0%, meaning that the FET (610) is switched off. If the motor controller (601) generates power, and the capacitance (612) charges, causing system voltage (611) to rise above 49 Volts, then the controller (601) will increase the duty cycle of the PWM. If the maximum operating voltage of the system is 60 Volts, then a simple relationship to use is to pick a maximum target voltage below the 60 Volts, such as 59 Volts, so that at 59 Volts, the PWM is set to a 100% duty cycle. Hence, a linear relationship of PWM duty cycle is used such that the duty cycle is 0% at 49 Volts, and 100% at 59 Volts. Other examples of relationships include: a non-linear relationship; a relationship based on coefficients such as one representing the slope of a linear line adjusted by a PID loop; and/or a PID loop directly in control of the duty cycle of the PWM.

In one embodiment, controller (604) is a micro-controller such that 15,000 times per second an analog to digital converter (ADC) measures the system voltage, invokes a calculation to calculate the PWM duty cycle, then outputs a pulse with a period corresponding to that duty cycle.

Safety

Figure 3B:
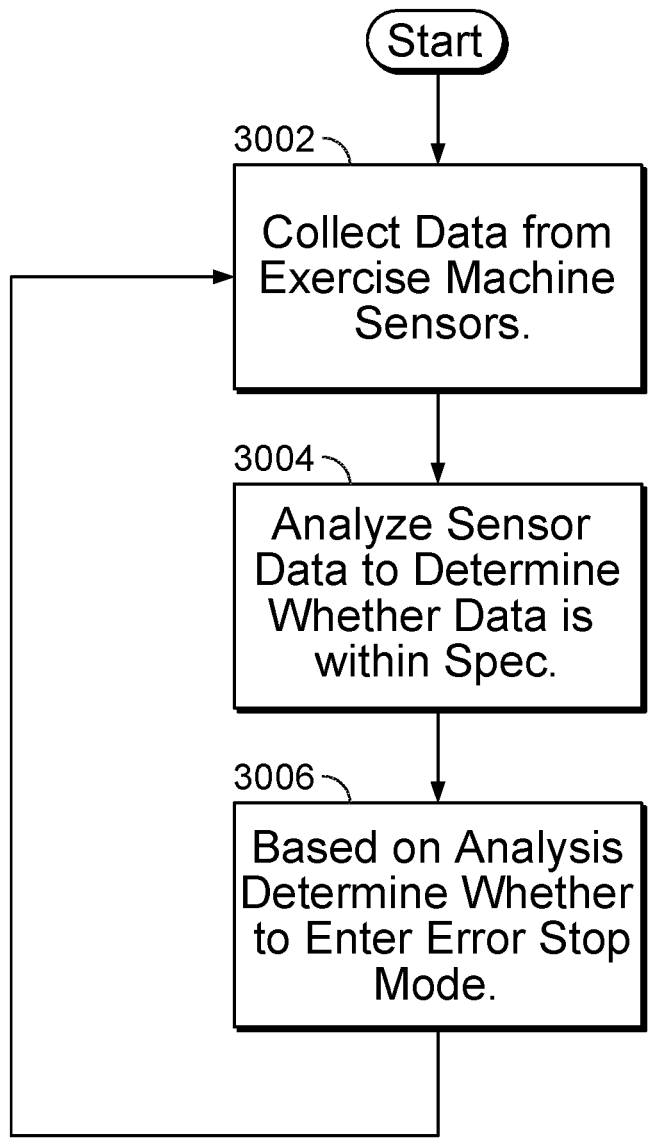
FIG. 3B is a flowchart illustrating an embodiment of a process for a safety loop for an exercise machine.

Safety of the user and safety of the equipment is important for an exercise machine. In one embodiment, a safety controller uses one or more models to check system behavior, and place the system into a safe-stop, also known as an error-stop mode or ESTOP state to prevent or minimize harm to the user and/or the equipment. A safety controller may be a part of controller (604) or a separate controller (not shown in FIG. 3A). A safety controller may be implemented in redundant modules/controllers/subsystems and/or use redundancy to provide additional reliability. FIG. 3B is a flowchart illustrating an embodiment of a process for a safety loop for an exercise machine.

Depending on the severity of the error, recovery from ESTOP may be quick and automatic, or require user intervention or system service.

In step 3002, data is collected from one or more sensors, examples including:
1) Rotation of the motor (100) via Hall sensors within the motor;
2) Rotation of the motor (100) via an encoder (103) coupled to the belt;
3) Rotation of each of the two spools (202, 203);

4) Electrical current on each of the phases of the three-phase motor (100);
5) Accelerometer mounted to the frame;
6) Accelerometer mounted to each of the arms (400, 402);
7) Motor (100) torque;
8) Motor (100) speed;
9) Motor (100) voltage;
10) Motor (100) acceleration;
11) System voltage (611);
12) System current; and/or
13) One or more temperature sensors mounted in the system.

In step 3004, a model analyzes sensor data to determine if it is within spec or out of spec, including but not limited to:
1) The sum of the current on all three leads of the three-phase motor (100) should equal zero;
2) The current being consumed by the motor (100) should be directly proportional to the torque being generated by the motor (100). The relationship is defined by the motor's torque constant;
3) The speed of the motor (100) should be directly proportional to the voltage being applied to the motor (100). The relationship is defined by the motor's speed constant;
4) The resistance of the motor (100) is fixed and should not change;
5) The speed of the motor (100) as measured by an encoder, back EMF voltage, for example zero crossings, and Hall sensors should all agree;
6) The speed of the motor (100) should equal the sum of the speeds of the two spools (202, 203);
7) The accelerometer mounted to the frame should report little to no movement. Movement may indicate that the frame mount has come loose;
8) System voltage (611) should be within a safe range, for example as described above, between 48 and 60 Volts;
9) System current should be within a safe range associated with the rating of the motor;
10) Temperature sensors should be within a safe range;
11) A physics model of the system may calculate a safe amount of torque at a discrete interval in time continuously. By measuring cable speed and tension, the model may iteratively predict what amount of torque may be measured at the motor (100). If less torque than expected is found at the motor, this is an indication that the user has released one or more actuators (800,801); and/or
12) The accelerometer mounted to the arms (400, 402) should report little to no movement. Movement would indicate that an arm has failed in some way, or that the user has unlocked the arm.

In step 3006, if a model has been determined to be violated, the system may enter an error stop mode. In such an ESTOP mode, depending on the severity, it may respond with one or more of:
1) Electrical self brake using back EMF of the motor, as described below;
2) Disable all power to the motor;
3) Disable the main system power supply, relying on auxiliary supplies to keep the processors running;
4) Reduce motor torque and/or cable tension to a maximum safe value, for example the equivalent of torque that would generate 5 lbs of motor tension; and/or
5) Limit maximum motor speed, for example the equivalent of cable being retracted at 5 inches per second.

Second Example

Another embodiment of the exercise machine is one that passes a load/resistance against which the user exercises, via one or more lines/cables, to a grip/grips that a user displaces in order to exercise. The grip is positioned relative to the user using a load arm and the load path to the user is steered using pulleys at load arm ends. The load arm is connected to the exercise machine frame using a carriage that moves within a track that is affixed to the main part of the frame, and the frame is firmly attached to a rigid structure, such as a wall or other structure such as a gantry. The orientation and position of the exercise machine may be alterable and determined by the target exercise set or user needs.

The exercise machine includes a controller, which measures user performance as well as determines loads to be applied to the user's efforts. The controller senses the load conditions that are generated, against which the user exercises. The sensors which measure the load conditions may take advantage of modern electronic technologies and materials and the controller data acquisition is sufficiently fast to be able to detect very rapid load changes, which load changes are representative of abnormal operation. Responsive to these predetermined threshold load points, the system controller and hardware may separately or in combination cause a rapid reduction in the energy transfer rates so as to limit or prevent further movement of the machine elements that may either injure the user or cause damage to the exercise machine itself.

The exercise machine controller may also be coupled to the environmental control for the exercise area so that in addition to enabling exercise parameters to be optimized and adjusting lighting, temperature and humidity as appropriate, alarm conditions may be signaled to alert others of the failure so that assistance may be made available if required. The exercise machine may be entirely self-contained and an alarm sounded locally or else may be connected to a data service that allows the emergency condition to be signaled remotely or to be broadcast.

Because the exercise machine uses cables which are routed through a rigid arm to position grips/stirrups for a user to operate, cable loading/tension may be relied on to determine load conditions. In use, the load arm/arms may be positioned to facilitate the exercise intended. An exemplary exercise machine has two load arms that may be positioned independently corresponding generally to right and left limbs of the user. The load/resistance applied, against which a user exercises, is determined by the controller and is provided by one or more actuators, such as electric motors, which may be precisely controlled and facilitates a wide range of exercise parameters. In the case where the actuator is an electric motor, one or more permanent magnet BLDC motors having a high pole count can provide the torque supplying the load that may be applied and, for those load ranges outside of the easy operation of the motor system, a gearing mechanism may be used. Such a system may be a gearbox, a worm drive, or a pulley system. Sensors measure user action and this information is processed by the controller which is used interactively with the exercise parameters.

The cables may be steered to the point at which the load is to be applied by a combination of pulleys and fairleads. Pulley load may be directly related to the tension on the cable since the cable is taut and the geometry unchanging during the exercise activity and so provides an accurate measurement of loading. Torque applied to a winding pulley may be measured and the resulting cable tension calculated. Cable tension may also be directly measured by the distortion measured in a transit block supported by the cable and this is suitable for continuously measuring extremely large cable loads, up to the yield points of the cable, with very good accuracy. A load cell may be coupled to a pulley that the cable routes over.

Alternatively, a load cell may be positioned in-line with the cable itself. As this may move exactly with the cable, it represents a challenging problem due to the need for an uninterrupted straight run equal to the maximum cable displacement coupled with repetitive flexing of the wiring that connects it. This latter electrical connection concern is typically dealt with by using a flexible printed wiring layout on a robust polymer substrate that is curved and folded so as to appear to roll on itself. Finding a straight run for the cable that matches the maximum cable travel may be poorly suited to a small exercise machine and implementation may vary for this category of tension monitoring.

Abnormal Conditions

Responsive to indications of abnormal loading conditions, the exercise machine controller, a dedicated independent hardware arrangement, or a combination of both may cause power to the load generators to be restricted and brought to a stopped condition very rapidly and without damage to these generators. Energy stored in magnetic fields may be dissipated using low resistance current shunts or batteries that may also act as powerful dynamic brakes for rotating machinery. Magnetic clamps or clutches may also be actuated to restrict the movement of loose cables or free rotation of parts with significant inertia.

In one embodiment where the actuator is hydraulic, not only may the pressure generating component be disabled or bypassed, but hydrostatic energy stored in any reservoir, including the sustaining pressure in the connecting pipes, may also be dissipated before the safe state is accessed. When an overload or abnormal load is detected, the source of pressure may be bypassed using a valve that is actuated by the controller. Because the flow of the hydraulic fluid may generate heat and noise that may be alarming to a user, it is important that the pressure source which is often a pump is de-energized soon after the source is bypassed. The actuator which translates pressure into movement and which is coupled to the load distributing cable may be short-circuited using another valve and in one embodiment a flow limiting valve prevents continued supply of driving pressure.

In one embodiment where a clockwork system, equipped with gears, springs and/or escapements is used to provide the load against which the user exercises, when an overload or abnormal load occurs, the loss of cable tension is used to alter the coupling to a drive component so that the cable is then locked in place and movement is restricted. The clockwork system is in part an energy storage system that may be wound by the exercising user working against the load. Part of the mechanically stored energy may be diverted to turn a small electrical generator which powers the exercise controller. When the controller detects an abnormal condition, the stored energy may be decoupled from the exercise components and simply used to continue to provide power to the controller without dissipating the stored energy directly and fully.

To provide reference points against which an abnormal condition may be established, the controller may record a use profile for the load distributions that occur during exercise. This record may embrace all the exercise conditions experienced by a particular user. In addition, load distribution profiles may be taken across the set of all users for all exercise sets and these parameters used to determine the bounds of normal operation. The datasets may be categorized to narrow the boundary conditions since a strong, well-conditioned athlete for example is unlikely to represent the performance norms for a user in a rehabilitation exercise phase.

The initial data may be loaded as a master record into semi-permanent memory for the exercise machine and a categorical reduction of this data range developed for each user as they exercise. A user performance record, or "fingerprint," may identify a user automatically and this may be generated at the initiation of each exercise period, by comparing a selected exercise set with a comparable exercise recently performed. Departures from the normal range may be flagged and monitoring of load conditions may be prioritized as limits are approached.

Enabling detection of abnormal load conditions in an exercise machine and mitigating consequential effects by the rapid dissipation of stored energy is disclosed. The exercise machine is brought to a controlled stop and a fault record generated for later analysis. The exercise machine may be reset and returned to normal operation once a fault condition has been cleared.

Motor Embodiment

Figure 4A:
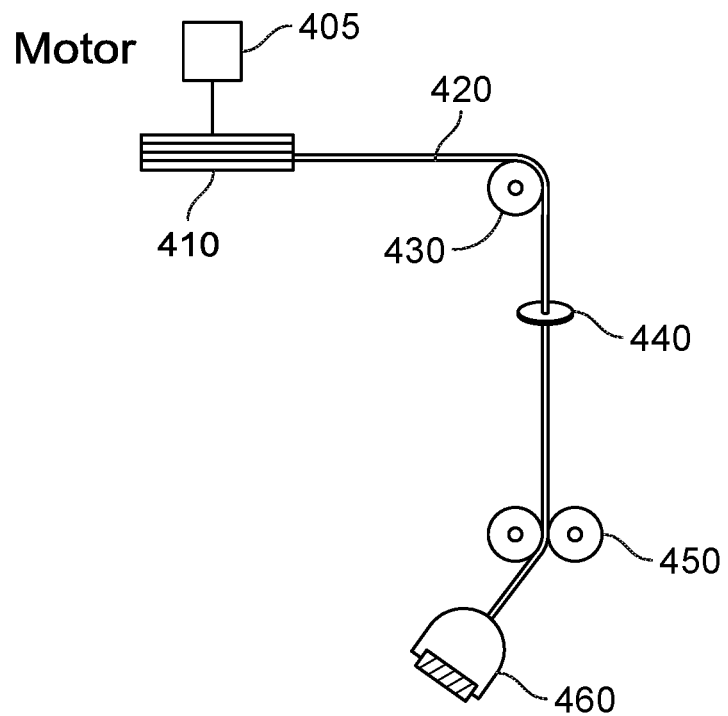
FIG. 4A is a simple representation of an exercise machine that uses an electric motor as its primary force generator.

FIG. 4A is a simple representation of an exercise machine that uses an electric motor as its primary force generator. Electric motor (405) is typically a permanent magnet motor having a high pole count, and may be coupled to a high resolution encoder. In one embodiment, the encoder is capable of measuring motor position with an accuracy of or better than one degree of electrical rotation. Because an objective is to provide a force generator having continuous smooth high force capacity at relatively low speeds, a multi-phase motor having closely spaced poles may be preferred. When the pole steps are only a few degrees of rotation apart, then the motor may be directly coupled to a drum (410) that spools a cable that may be used for load transfer. A motor having a coarser pole spacing may be utilized by interposing a reduction gearbox between it, (405), and the cable drum (410).

Coupling to the element that is operated by a user, such as a grip/stirrup (460), is provided by a cable (420) assembly that is routed by one or more pulleys, (430), (450), passing through or along the load arm or arms and into the exercise machine where it is attached to the spool or drum (410). The cable may be a multi-stranded construction and the segment (440) may be enclosed for preventing inadvertent contact with a potentially hazardous cable surface that may occur should a single strand be compromised and break.

In one embodiment, the cable passes from the point where it is enclosed within the main enclosure/frame of the exercise machine itself to the point (460) at which the user applies forces in the course of exercise. The user point may be located at the end of an arm, which arm may be positionally adjusted to suit the user and the particular exercise being performed. Except in very specific cases, the route from the force generator to the user's limb is not a straight line and so a cable may be used as the force transfer means. Changes in direction may be achieved by passing the cable over suitably positioned pulleys except that when the change in direction is very small, in the neighborhood of a degree or two, then a fairlead may be used instead, at the cost of some frictional losses. The pulley (430) may be affixed at the point where the cable enters the arm assembly and in one embodiment is fitted to a carriage which slides on the exercise machine to position an inner joint of the arm vertically or horizontally. Alignment with a pulley may not be critical and a small angular deviation may be tolerated out of the plane of the pulley.

At the outer end of the arm through or along which the cable is routed, a further one or more pulleys (450) may be used so that the user-applied forces may be relieved of the need for being in line with the pulley or pulleys.

Figure 4B:
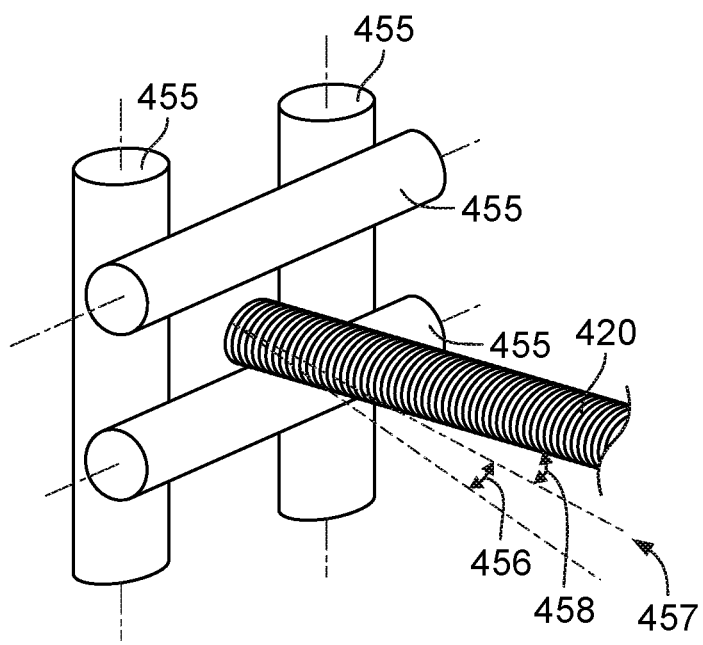
FIG. 4B is an illustration of a system of rollers in an exercise machine.

FIG. 4B is an illustration of a system of rollers in an exercise machine. In one embodiment, the pulley system (450) of FIG. 4A is comprised of a system of rollers (455) in FIG. 4B that allow a deflection of the cable over the full 360° possible in the hemisphere beyond the rollers. Cable (420) may have deflection (456) from the extended centerline (457) of the cable feed in the horizontal and (458) upwards in the vertical. Rollers (455) may be fitted with bearings to allow them to turn freely and in this configuration, the cable experiences only rolling friction and no significant loss due to the angular change; the loss due to inter-strand friction may be safely ignored in normal use with bend radiuses being predetermined by pulley or roller radii.

Unpowered State

When the exercise machine's force generator, in this case the motor (405), is unpowered pulling on the user grip/stirrup (460) may exert a force on the cable spool or drum (410) which force is resisted only by drag in the system and the inertial load of the motor (405). It may be important that the cable is maintained in a state of tension, though this may be a minimal amount, so that a slack cable does not become detached from either the cable spool or from the one or more pulleys that are used to route the cable.

It may be important that the motor not be allowed to spin freely because the motion of the magnets in a permanent magnet rotor machine may generate significant voltages that may damage the semiconductor components used to switch power in normal operation. A motor of this type may be prevented from significant movement by providing a very low resistance path for the currents produced in the energizing coils when the magnets in the rotor move past them. This may be achieved using a suitably rated contactor to provide a fail-safe short circuit path. The same effect may be achieved using the semiconductor drive components if power continues to be available to the drive electronics.

Exercise Machine Controller

The exercise machine controller, or in some cases controllers, comprise one or more processors coupled to interface circuits and includes many of the elements of a typical computer system. One or more sensors may be used to determine the cable loading status. Cable motion may be determined in several ways. In one embodiment, the cable (420) is spooled on a drum (410) coupled to an electric motor (405). This drum may be monitored by a system for counting the distance and direction moved. In a directly coupled system, the electric motor may use an encoder to determine the angular position of the rotor. This is necessary in order for the control electronics to be able to apply power to the proper phases in the proper order to provide the required motion or load parameters.

However, in the case where a compliant coupling is used to join the drum (410) and motor (405), the motor encoder data may not accurately supply the drum position and speed information. In this case a separate encoding system that reports drum activity may be used. Derivatives of position may be used to estimate speed and acceleration data. In one application, the cable (420) is layered onto the spool/drum (410) in a single layer so as to provide a constant radius for the cable winding which simplifies calculations.

Drum (410) torque may be computed from the applied motor (405) torque, which in turn may be pre-determined and related to the motor phase currents. In one embodiment, the drum (410) is coupled to the motor (405) using a torque measuring device. In normal operation, the torque may change smoothly in a predictable fashion, but if a cable (420) breaks or jams as a result of abnormal operation then the sudden step change in torque may be used to precipitate an emergency stop. For example if the user is exercising and suddenly releases the cable end by letting go of a grip/stirrup (460), then sudden retraction of the cable (420), or pair of cables in the case where both arms are being used, may cause injury to the user.

Cable loads which are generated by the user working against a motive power system may be an electric motor or other actuator type; for example a hydraulic actuation may be used wherein the pressure is controlled, or a screw actuator may be used where the rotation of the screw is powered either electrically or hydraulically. In one embodiment, a permanent magnet brushless electric motor (405) having a high pole count and capable of producing very high torque is used. A particular benefit to using a high pole count motor is that the torque may be held relatively constant as the rotor steps from pole to pole so that there is no sense of pulsing transmitted to the user.

Motion and torque or load may be coupled to the cable systems that the user displaces or loads, using a simple drum system that winds the cable in or out, a pulley system that alters the length of the cable or an equivalent power transmission system. Where a system is used that is not directly coupled to an electric motor as described above, it may be necessary to deal with unintended motion or creep as a result of mechanical play, or residual pressures in the case of a hydraulic actuator, and in one embodiment a brake assembly is fitted to the spooling drum. This brake may be an electromechanical component that locks the drum in a fixed position upon command from the exercise machine controller or controllers.

Emergency Stop

In an emergency stop condition, the machine may be brought to a rapid stop as safely as possible. Although a sudden stop is possible, the loads created and transferred to the user and the machine structure are designed to not cause injury or damage. Conditions leading to an emergency condition may be considered and appropriate responses defined so as to produce as graceful a de-powering as practical.

There are at least four areas that may have emergency conditions associated with them, these being exceptions arising from the power system, thermal conditions, the control system, and firmware.

Power Inconsistencies

Power system exceptions are generally characterized by voltage or current excursions that are outside predetermined limits and/or inconsistencies. A gross failure of the power supply, such as loss of power may be sensed by monitoring incoming supply for over- or under-voltage, inadequate AC, overcurrent, and over temperature. Stored energy in the power regulating system may be used to provide power to smoothly bring motors to a graceful halt and then either brake or lock the moving parts to prevent further motion. Low power circuits, which draw only comparatively small current, are designed to be able to run for a period after main power is disconnected. Alternatively, battery backups or supercapacitors may be used to store sufficient energy to accomplish this graceful halt.

Thermal Inconsistencies

Thermal exceptions and/or inconsistencies may occur due to current being drawn through the electrical components to create tension in the cables or the opposite current being generated by the user with tension on the cables causing the current flow to reverse and need to be either shunted off into the resistor or into a power storage device such as a battery or capacitor. If thermal limits are reached the system may reduce tension, such as continue to operate in a degraded mode, or at higher temperatures, cause an emergency stop mode until the system cools off sufficiently. The system monitors temperature of at least the motor (405), the main drive MOSFETs (120-125), the MCU (600), and/or the heat shunt.

Control System Inconsistencies

Control system exceptions and/or inconsistencies may be detected as the machine controller monitors out-of-bounds conditions arising during use of the machine. Control system exception conditions include improper electrical angle, high current, over- or under-voltage, and problems with the power-supply voltages or shunt currents. In one embodiment, electrical angle measurement is considered as drifting too far off when it meets or exceeds 10 degrees of electrical angle error. Angle error may also be caused by slippage or stretch in the some of the system elements. In the exercise machine, $10/23$ degrees of mechanical angle drift may be sufficient to start producing excess heat and lower cable tension. These operating problems increase dramatically as angle error increases and if this angle error exceeds 180 degrees, the motor system may start to run backwards. A secondary sensor may be used to detect and possibly correct this. This secondary sensor may be an additional positional sensor such as a position encoder, back EMF sensor, hall sensor, or tension sensor. If this secondary sensor is able to correct the position of the motor during runtime, then it does so, otherwise, the system enters a controlled stop, informs the user of this, and reinitializes.

In one embodiment, for high current exceptions, the control system relies on motor current sensors, and a secondary current sensor in the MOSFET driver chip. If any of these sensors reports too high a current, the system initiates a controlled stop, and reinitializes to check if the fault is cleared. For voltage exceptions, the exercise machine may use a current drive system and tolerate a wide range of voltages. However there may still be exceptions if the voltage gets too high or too low. These conditions may require a controlled stop and reinitialization to check if the fault is cleared.

In monitoring the power supply, the control system checks for voltages that are too high or too low. In the case of excessively high voltages, the system turns on the heat shunt; for voltages that are too low, the system performs a controlled emergency stop before the power supply fails. The control system monitors for currents in the heat shunt that are too high. In the event that currents are too high, the system initiates a controlled emergency stop. In addition to this, the exercise machine may include backup hardware shunting that is activated if the firmware control system fails, but the system is still powered. This backup shunting protects the electronics of the machine from damage.

Firmware Inconsistencies

Firmware exceptions and/or inconsistencies may arise during use of the machine. If a fault occurs which can be remediated, such as a subroutine failing to complete within a prescribed time, then a simple reset timer or watchdog may be used to force the exercise machine to a predetermined state. As a general case, many of the exercise machine functions may follow a state machine, where the exercise machine moves from one predetermined state to another keyed by certain conditional matches.

For example, if a simple routine is considered where the user exercises by extending the cable from the cable spool, pausing and then relaxing so that the cable can be wound back on the spool, then cessation of extension of the cable can be used as a condition that, in conjunction with a reduction in user effort may move the machine from the "release at a defined rate" state to a "retract at a defined rate" state. If a user miscues and simply releases the cable, then it would be inappropriate for the exercise machine to rapidly rewind the cable and in the absence of tension, might be moved to a "pause" state that is a forced stop until the user commands a continuation or other recovery process.

An example of this latter command may be that the user applies tension briefly at which point the exercise machine may gradually retract the cable to a predefined point. The distinction between an emergency and an urgency is a design choice and may be construed as a feature of the software program that causes a particular exercise routine to be invoked; whether an exercise machine performs a hard stop or a soft stop is determined principally by the risk of user injury, followed by the risk of machine damage.

In another example, positioning errors may occur; a worn drive belt may become slack in some circumstance which may cause the motor position and cable spool position to differ and in this case the operation may be aborted until a recalibration has taken place; a typical start-up procedure might rewind the cable entirely to determine the initial position and if this error condition persists, as noted in error logging records, then it may be appropriate for the exercise machine to halt and then to request that a new drive belt be fitted before further use is permitted.

In one embodiment, firmware-detected faults that do not require an immediate emergency stop include: i) the cable is stuck and does not retract in which case the machine enters a degraded mode to avoid overheating and stops pulling on whatever is holding back the cable; and ii) the user has disconnected a cable positioning element, in which case the machine reduces the cable load so that the user can move the element.

In one embodiment, firmware-detected faults which may cause an emergency stop include: i) the cable spooling time to completely retract the cable assembly takes too long or the motion exceeds the expected distance, ii) communication errors with sensors such as controllers, drivers, and position sensors.

In one embodiment, upon switch on, the exercise machine may perform a number of start-up checks to ensure that sensors are operating as expected. Cable tension may be tested by "overwinding" the system, position resolution may be tested by a pre-programmed jog of the motor. Power supply operation may be verified by drawing a preset current through the motor using a defined energization period and measuring and comparing this current with the expected current.

Electrical Self Braking

In one embodiment, the machine accomplishes an emergency stop via electrical self braking using back EMF of the motor. It is a special property of BLDC motors that shorting the phases of the motor causes an opposing force against the motion of the motor. The higher the force of the motion the higher the force of the opposition.

To use this property of BLDC motors, one embodiment uses one DPDT relay. An alternative embodiment uses 2 or 3 SPST relays, wherein solid state relays or electromagnetic spring relays may be used. A third embodiment uses multi stage setup relays that connect a resistance briefly first to drain some power and then connect the direct short relay. This type of normally closed relay is needed for when the system is not powered. If the system is powered a similar mechanism can be achieved using the H-bridge MOSFETs (120-125).

Figure 5:
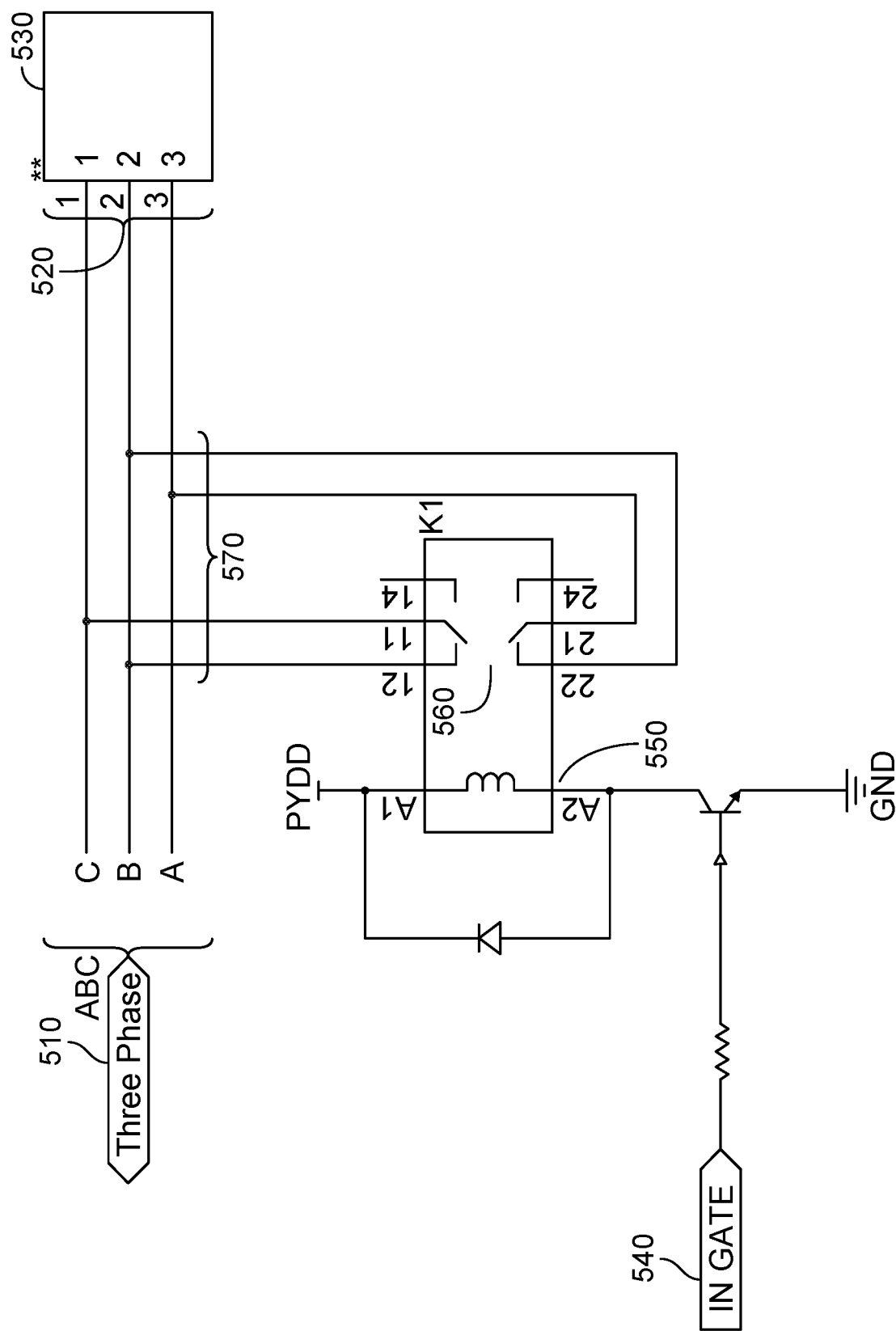
FIG. 5 is a circuit schematic of one embodiment for electrical self braking.

FIG. 5 is a circuit schematic of one embodiment for electrical self braking. Three phases are shown for the purposes of example and without limitation. More than three phases may be provided for. In operation, driving current to the motor is determined by the motor controller (600). The current may be limited by using current limiting circuits in the controller or the driving voltage may be altered to achieve this. In one embodiment a pulse width modulation scheme applies voltage pulses of variable duration to the motor phases.

In the case of an exception raised due to thermal conditions, control system, or firmware, in which the system has determined that an emergency stop is the best action, the motor controller may deactivate motor controller connection (540) and three-phase power control (510) simultaneously. This may allow relay (550) to close relay contacts (560) and short the motor phases (520) and (570) together.

In the case of an exception due to the power system failure, the loss of power may deactivate motor controller connection (540) and three-phase power control (510). This may allow the relay (550) to close relay contacts (560) and short the motor phases (520) and (570) together.

In both cases, the three-phase power is stopped from reaching motor connection (530) given that the motor phases (520) and (570) are shorted together. This shorting of the motor phases (570) causes an opposing back EMF force to any motion of the motor. The force is directly proportional to the velocity of the rotation of the motor and thus brings the motor to a gradual, controlled stop.

Hotspots

In motors that produce high torques, the magnetic fields are large and to achieve the fields at the poles, substantial currents in the order of tens or hundreds of Amperes may be produced in the coils that energize that pole. This means that the resistance of the winding is generally very low. When the field collapses after power is removed, there is no effective means of limiting current flow and a contactor, being a mechanical device, fails to achieve instantaneous low resistance. The transition between open circuit and short circuit coupled with mechanical bounce of the contacts may result in extreme hotspots on the contacts, often sufficient to melt the contacts together as an arc is formed in advance of full contact.

This may be especially of concern with direct current components as there is no self-extinguishing of such an arc. By way of example, if a typical switch is inspected, it is usual to find a contact rating for direct current switching and for alternating current switching wherein the AC rating is far higher than the DC rating because any arc formed is extinguished as the AC flow passes through the zero point every half cycle.

An approach to reducing the contact rating required in a very high power motor as described above is to have a multistage relay setup as shown in FIG. 5 and described above to bleed some of the power through a resistance before closing the next stage of the contact. This approach is an example of managing very high power motors or using lower current rated relay components to achieve a similar result on lower power motors. Contact and resistance ratings may be based on the motor's power generation specifications and its rotational velocity. Alternatively, multistage may also be achieved by performing the initial braking with the H-bridge MOSFETs (120-125) since these are already rated to support the full power of the motor so they may be used to bleed off the power into a shunt resistance before closing the relay contacts (560).

Machinery Damage

Note that sudden stoppage of the motor creates a significant risk of damage to the supplementary components. The step change in inertia of rotating elements may be borne by deformation in the coupling components and repeated stresses of this nature in non-deformable parts may inevitably result in breakage at some point. The stationary outer housing of the motor may absorb the rotational energy stored in the rotor during a sudden stop.

To counter this, compliant force absorbers such as rubber or spring couplings and mountings may be used, but a preferred solution is to brake the rotating parts progressively so that no single braking step exceeds the capability of any of the coupling or suspension elements.

The mechanical systems may be engineered to manage the inertia of the motor and associated moving parts as rapid direction changes is part of the normal usage of the machine. However the emergency stop mechanism described above feeds the generated power back into the motor phases itself and the opposing force of the back EMF causes a controlled progressive stop, thereby avoiding or minimizing the risk of deformation of supplementary components.

Given this, a full mechanical lockout may be applied only once the system has come to a complete stop. The main protection of a full lockout is to avoid the user extending the cables any further or creating electrical energy once the system is fully shutdown. This may also be considered child protection/tamper protection in the case of a normally shutdown system in addition to the final stage of an emergency stop.

A mechanical stop may be solenoid spring controlled like a lockout pin dropping into the motor or gearing. Alternatively, a ratchet mechanism locking on the belt or gearing may be used.

Figure 6:
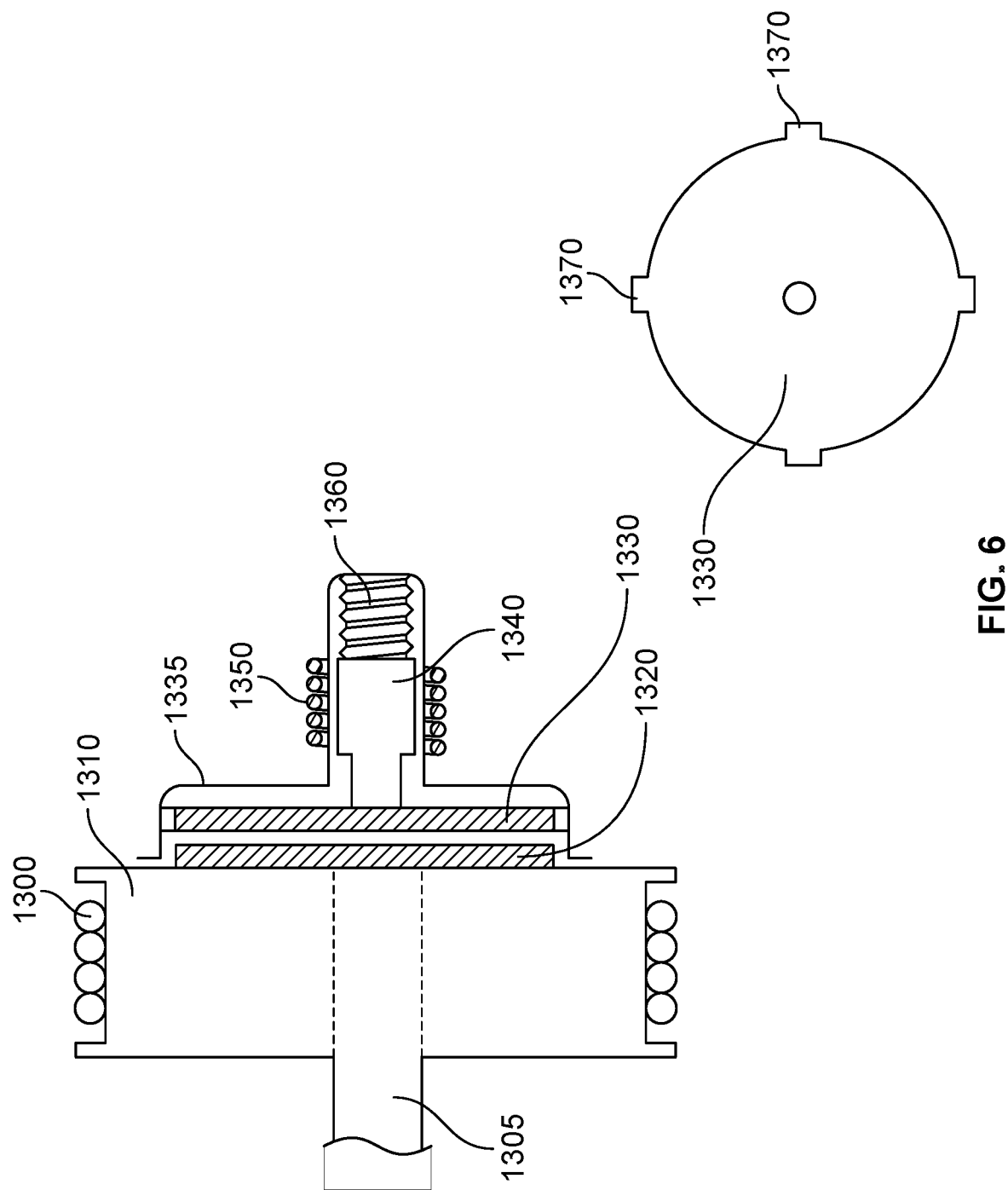
FIG. 6 illustrates an example of an electromechanical brake.

FIG. 6 illustrates an example of an electromechanical brake. The cable (1300) is shown wound onto a drum or spool (1310) as a single layer. The drum is coupled to the motor spindle (1305) and has a friction plate (1320) attached to it. A corresponding braking plate (1330) is held stationary in rotation and is forced against the friction plate (1320) by spring assembly (1360). In use, the drum assembly (1310) is released by applying an electric current to coil (1350) which acts on a magnetic slug (1340) that is attached to the braking plate (1330) so as to draw it away from the drum, against the spring pressure. If there is a power failure, then the coil (1350) is de-energized and the braking plate engages with the drum friction plate and brings it to a stop. Ears (1370) that slide into matching slots in the brake plate housing (1335) are used to prevent relative rotational motion between the housing and the brake plate and the housing secured so as to hold it fixed with respect to the exercise exercise machine.

Figure 7A:
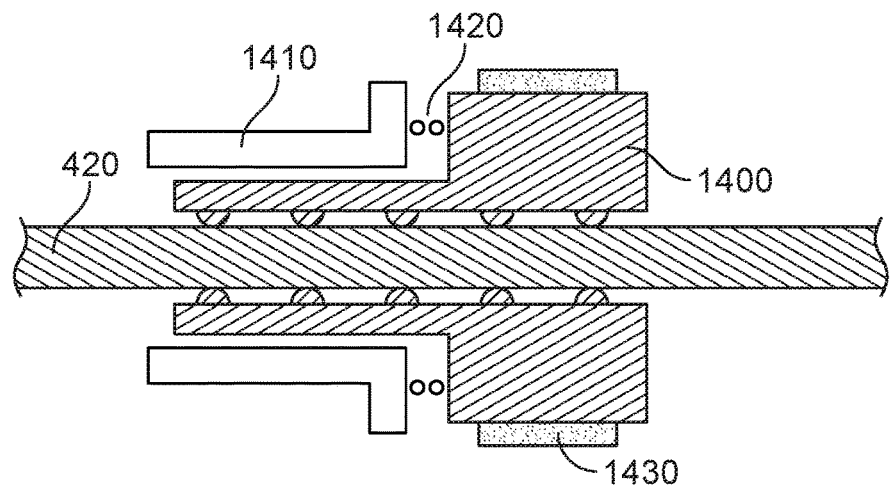
FIG. 7A illustrates an example of a cable braking system.

In another embodiment, the braking system is applied to the cable or cables themselves. FIG. 7A illustrates an example of a cable braking system. In one embodiment, this braking system is installed on a part of the cable run that is straight and position invariant with respect to the exercise machine frame. A sleeve (1400) is sized so as to allow the cable (420) to move freely within it. The sleeve is slotted so as to allow deformation in the same way as a collet deforms to hold a part that is otherwise free within its jaws. The sleeve is tapered and fits inside a matching taper in a retainer which is firmly located relative to the exercise machine frame.

The sleeve and retainer may be held apart by a spring element (1420). The brake may be engaged by a clamping band (1430) which causes the sleeve to bind on the cable whereupon the cable movement pulls the sleeve further into engagement with the retainer. The taper compresses the sleeve into firm engagement with the cable and prevents further movement in that direction. To disengage the brake and free the cable, the cable movement may be reversed and the clamping force, applied by the band (1430), removed from the sleeve. The inner surface of the sleeve through which the cable passes may be striated so as to maximize grip performance with the cable.

Figure 7B:
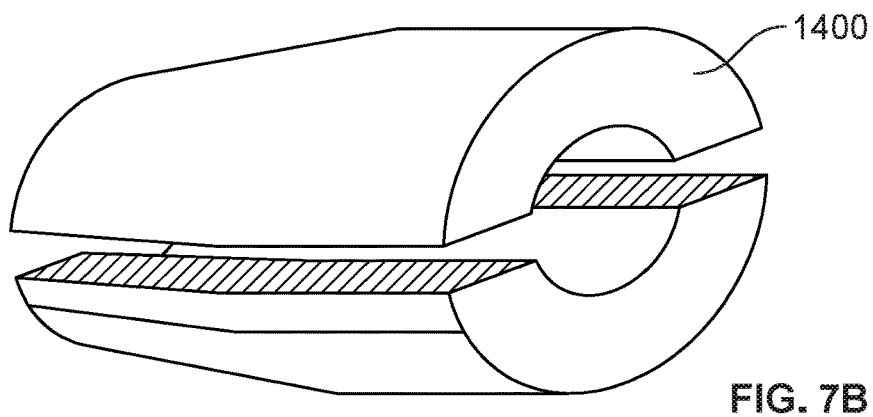
FIG. 7B is an isometric view that shows a simple split sleeve which facilitates replacement during maintenance periods if required.

FIG. 7B is an isometric view that shows a simple split sleeve which facilitates replacement during maintenance periods if required. A single piece sleeve may be fabricated by partially slitting from either end, preferably with the two or more sets of slits overlapping and at right angles to each other. In one embodiment, three pair of slits is used to improve braking performance.

To monitor the cable, load sensors may be connected to the controller. These sensors may include force sensors to measure cable tension that is proportional to the load applied as well as movement sensors that measure displacement of the cables and components. The controller may store this load and displacement data including a time reference as part of its user tracking function. In one embodiment, the cable tension is determined by the force applied to a pulley or pulley assembly that displaces the cable slightly. As tension is increased, the cable attempts to straighten, which force is measured by the strain on this pulley or pulley assembly and this strain is converted to a measure of the tension applied.

Figure 8:
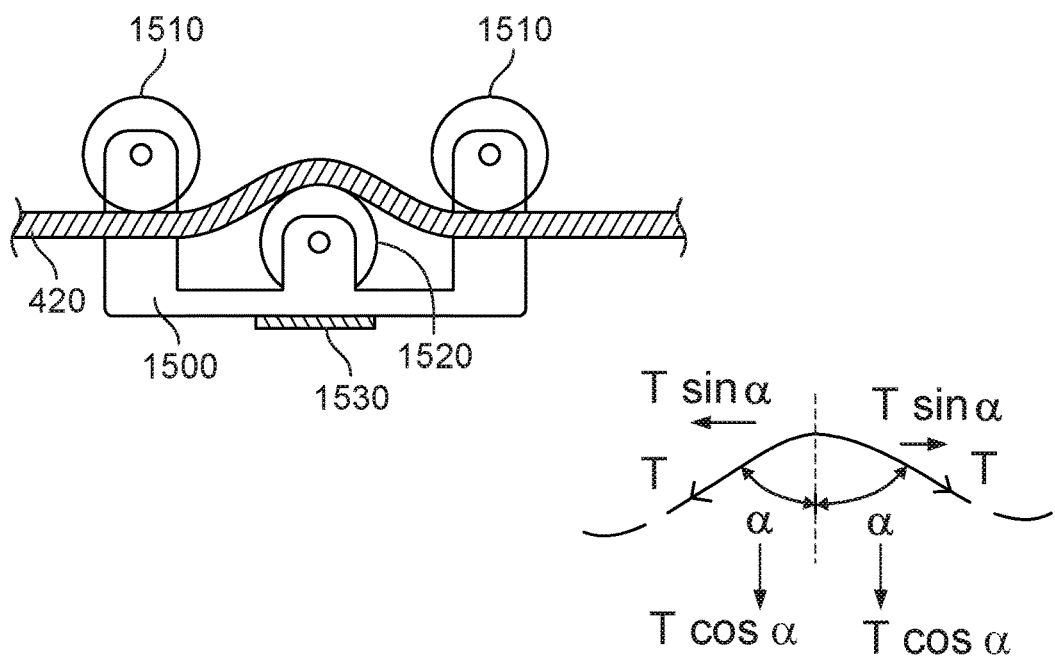
FIG. 8 illustrates a simplified assembly that permits cable tension to be monitored.

FIG. 8 illustrates a simplified assembly that permits cable tension to be monitored. The cable (420) passes over pulleys (1510) which are secured in a frame (1500) along with pulley (1520). It may be seen that the cable is displaced slightly by pulley (1520). The effect of this is that cable tension may try to force pulley (1520) down so that the cable is straight, but this action is resisted by frame (1500). The frame is subject to a stress which results in a strain on the frame which in turn may be measured by strain gauge (1530). The accompanying diagram shows that the cable may be represented broken into five segments, three of which are curved over the pulley and two of which may be assumed to be straight.

Assume that the cable tension may be represented as T and that the angle between the vertical axis of the pulley and the cable is $\alpha$. The horizontal component of the cable tension is seen to be $T \cdot \sin \alpha$ directed outwards from the pulley for each half of the diagram, so these two forces cancel each other and there is no net displacement. The vertical component of the tension force is seen to be $T \cdot \cos \alpha$ from each half directed downward, which sums to $2 T \cdot \cos \alpha$ which is balanced by $T \cdot \cos \alpha$ directed vertically at each of the outer pulleys (1510). This results in a bending moment that causes a strain in the frame cross member and this may be measured. Calibration may be achieved by the straightforward application of known weights to the cable on the finished exercise machine.

If the pulley is flexibly mounted in the vertical direction, then the displacement of the pulley may be used as a measure of cable tension. In this embodiment, the pulley may be supported by a spindle that is loaded against a spring. Increasing tension in the cable compresses the spring and the movement or displacement may be measured directly using, for example, a potentiometer actuated by this displacement. In one embodiment, the angular displacement of a component to which the cable is tethered is measured and cable status calculated or derived. By keeping a record of the cable tension and its displacement, exercise performance and any irregularities may be inferred. In one embodiment, this harvested information is used to modify the exercise parameters to set a performance level and to control irregularities.

Load Relief

As described above, safety considerations require that any unexpected or potentially dangerous operations be detected and remedied. Sudden load application during movement in the course of an exercise may be unpleasant and in some users can cause sprains and muscle strains. It is important, therefore, that some load relief mechanism be provided to limit this risk. In one embodiment, a magnetic clutch is provided that decouples the actuator from the user-manipulated elements such as the grips or stirrups that are normally used. The controller may detect the unexpected operation by comparing the demanded operation with the actual operation of the actuator. The difference between demand and result may be pre-determined and may invoke a shutdown program that includes depowering the actuator and braking the actuator.

In an electrically actuated exercise machine, one or more current limiting settings may be used to perform this function. In a hydraulic actuator, flow-limiting orifices may be used to perform the function. Snap loads may be limited using magnetic couplings between the actuating cables and the actuator. Load absorption may be performed using spring connections or biases applied to pulley combinations. The controller may keep a log of all detected error conditions and report these when queried either locally or remotely. Although automatic reset for incidental faults may normally be made available to a user, preferably the user cues the reset in response to information provided by the controller. Hardware limiters may be used to overcome catastrophic failure of the actuator drive and prevent movement until the fault is rectified.

Figure 9B:
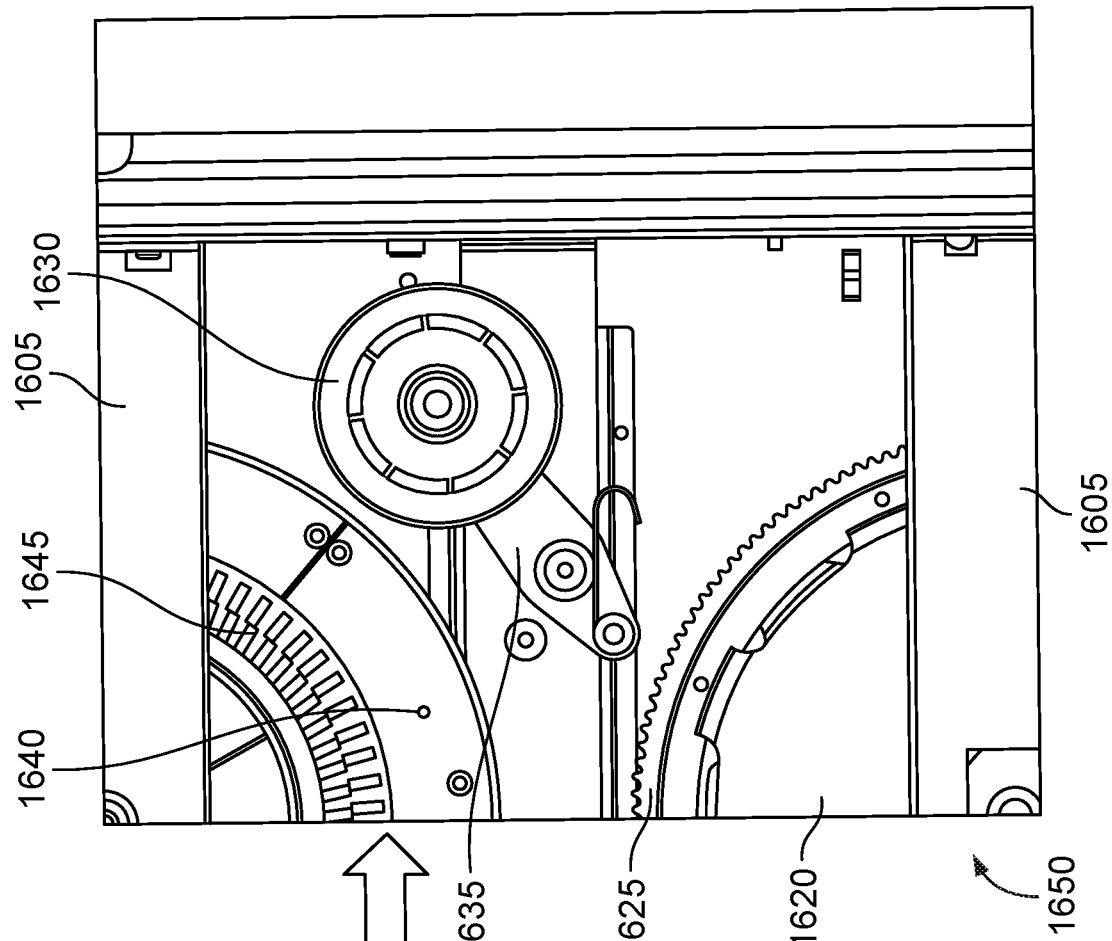
FIG. 9B shows an enlarged segment (1650) of the illustration in FIG. 9A.
Figure 9A:
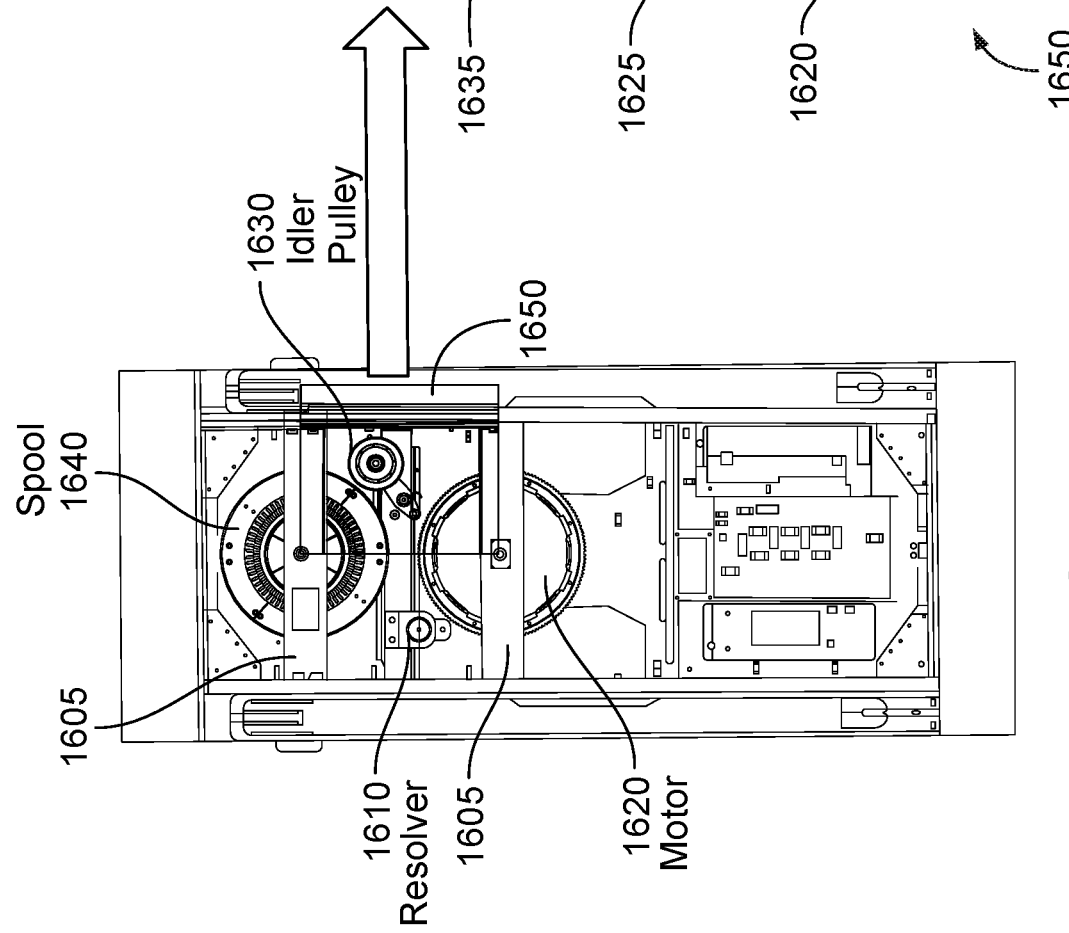
FIG. 9A is an illustration of an exercise machine.

FIG. 9A is an illustration of an exercise machine. In the upper part of the machine, two support beams (1605) carry the outer mounting points of the motor (1620) spindle and the cable spool assembly (1640). A toothed belt, not shown, carries the drive forces from the motor to the cable spool. The belt is routed so that it engages with a resolver (1610) that allows the position of the cable spool to be determined, and also passes by a tensioning or idler pulley (1630) that ensures that the belt is not allowed to become loose. If the belt does become loose, then there is a danger that it might disengage momentarily from the motor or spool and may slip a tooth which could result in a severe position error and jolt that would be passed to the user via the connecting cables (420).

FIG. 9B shows an enlarged segment (1650) of the illustration in FIG. 9A. A portion of motor (1620) is shown and the toothed drive component (1635) upon which a toothed drive belt rides is shown. The cable spool (1640) has a matching toothed circumference which is masked by side plates and an encoder pattern is shown at (1645). This serves as a means to detect cable motion in the event that a drive belt becomes disconnected and may be monitored by an optical sensor.

Cable spool movement may be determined by any of optical, magnetic or electrical methods such as capacitive sensing. Pulley (1630) provides a reliable means of establishing belt tension. In one embodiment, the support bracket (1635) incorporates a strain measuring system that allows the continuous monitoring of belt tension statically and dynamically regardless of the direction of rotation of the motor and spool assemblies. Belt breakage or disconnect is thus evident and does not rely upon the resolver (1610) or encoder (1645) so that an emergency condition may be recognized immediately and shut down actions initiated promptly.

In one embodiment, idler pulley (1630) is equipped with a solenoid operated clutch assembly that is used as a mechanical brake to lock the cable spool (1640) in position and may also be used to dissipate the inertial energy in an emergency stop. One advantage to using this kind of braking system is that it fails safe in the event of power failure since power is needed to hold the clutch disengaged; a spring system may be used to engage the clutch.

In summary, monitoring is provided of loads in a cable that transmit forces against which a user exercises. Excessive or abnormal load transients are detected and used to trigger an emergency shut down that removes power from one or more force generators and brings any motion of the machine to a safe controlled halt. Energy stored in the electric motor may be dissipated progressively and stopped quickly. Electromechanical brakes may be used to lock components in a fixed position to alleviate jamming and over-run abnormalities.

An exercise machine includes a fault monitor for detecting abnormal operation. Load transients are used to trigger an emergency stop procedure that halts further motion of the machine. These transients may be predetermined or derived from user personalized information in response to training records.

Figure 10:
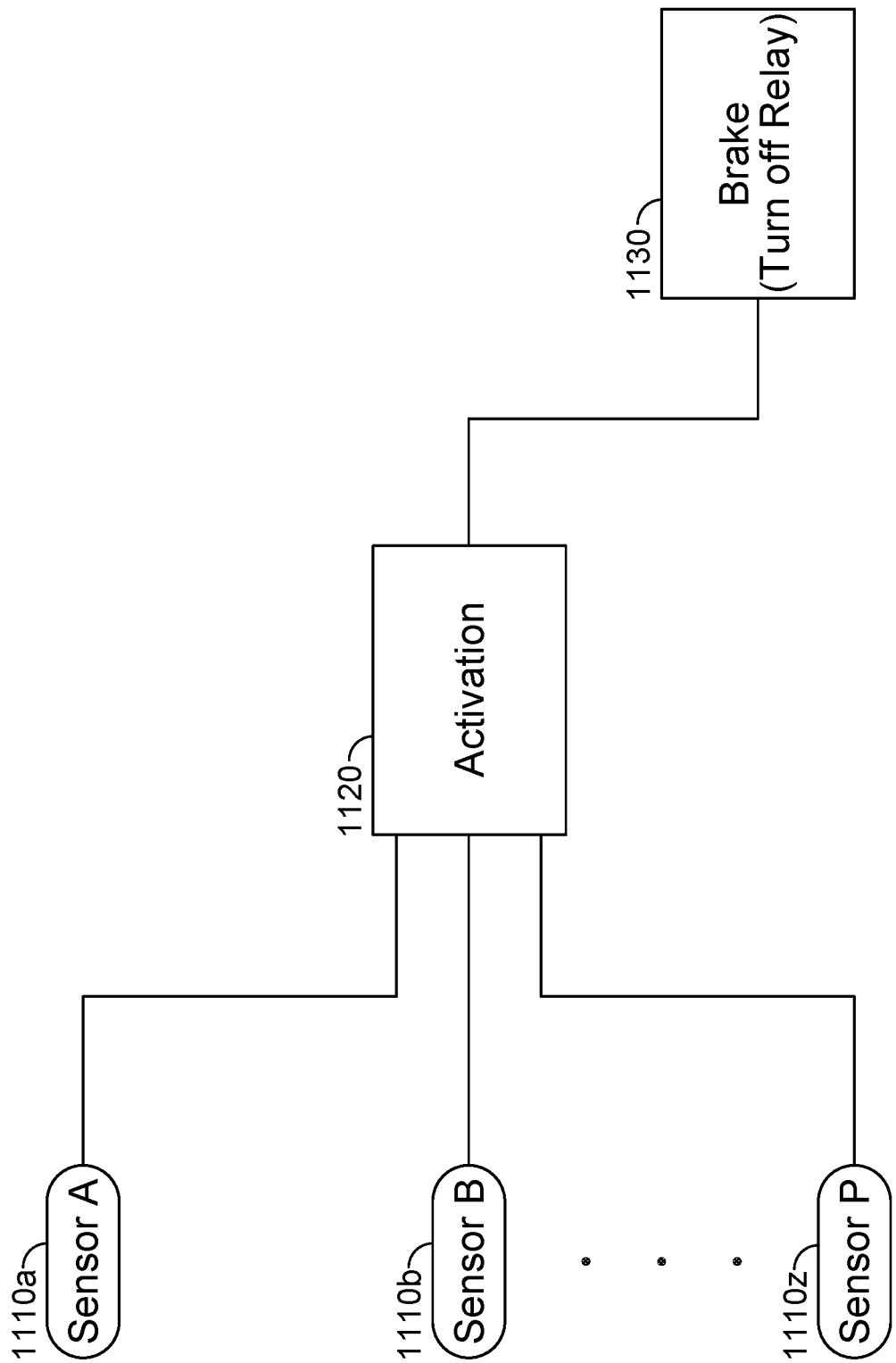
FIG. 10 is a block diagram illustrating an embodiment of a system for an exercise machine emergency motor stop.

FIG. 10 is a block diagram illustrating an embodiment of a system for an exercise machine emergency motor stop. One or more sensors (1110a, 1110b, . . . , 1110z) are coupled to a safety controller (600) wherein the safety controller is configured to deassert the safety signal to activate (1120) the braking system (1130) in an event of a sensor detection and/or qualification from the sensor. One example of a brake is a motor brake, which as described above is engaged by turning off a relay (550) to short leads of the motor together (520), (570).

Sample sensors (1110) include ones that emit a sensor failure when failed, and/or detect:
a power failure;
a memory loss and/or corruption;
a motor positioning inconsistency;
a motor speed inconsistency;
a motor acceleration inconsistency;
an electrical voltage inconsistency;
an electrical current inconsistency;
an electrical power inconsistency;
a temperature inconsistency;
a frame acceleration;
an arm acceleration;
a watchdog timeout;
a boot validation failure; and/or
an illegal instruction fault.

The safety controller may also deassert the safety signal in an event of controller failure, and/or deassert the safety signal in event of relay failure.

Figure 11:
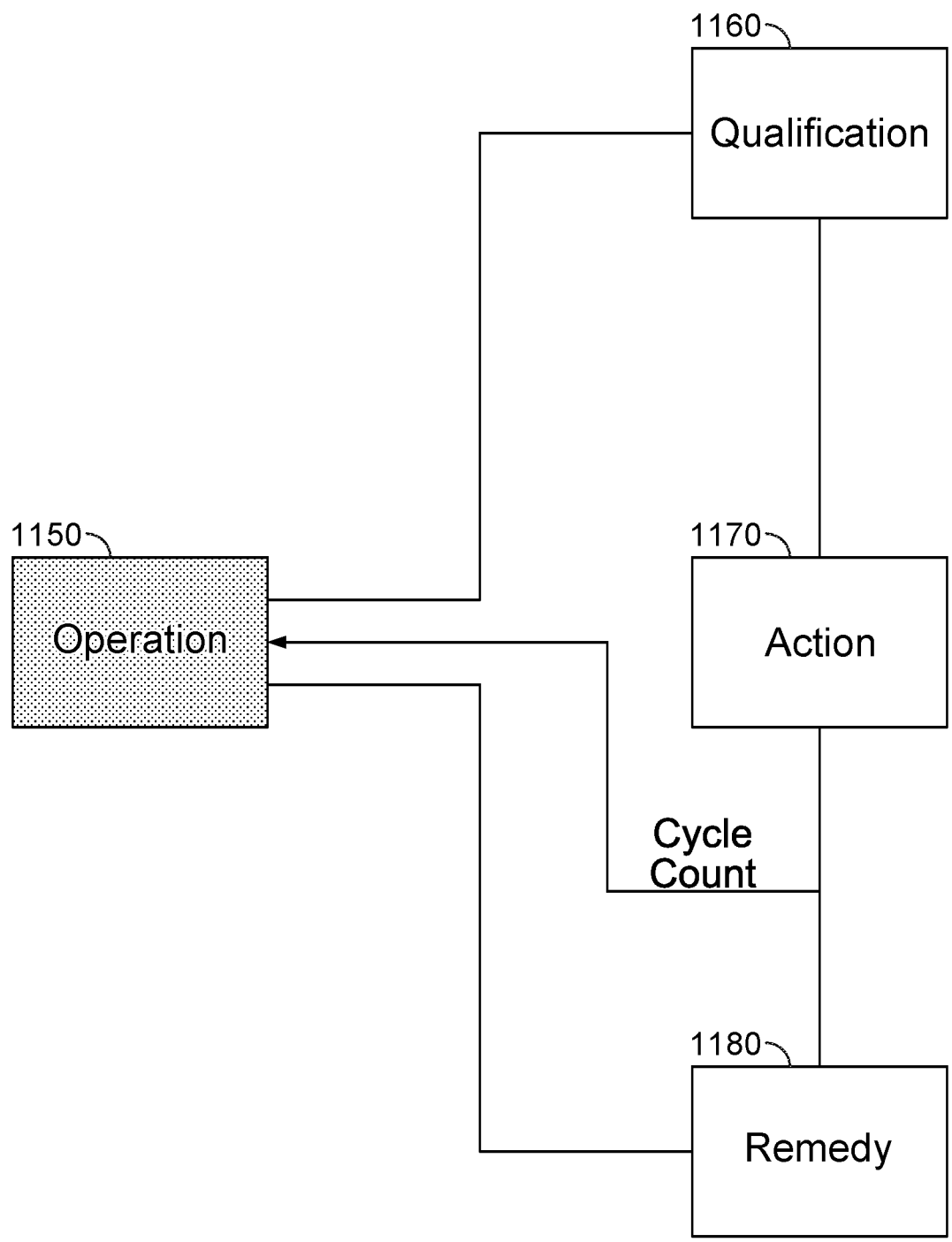
FIG. 11 is an illustration of an embodiment of a state flow for an exercise machine emergency motor stop.

FIG. 11 is an illustration of an embodiment of a state flow for an exercise machine emergency motor stop. The state flow shown in FIG. 10 may be orchestrated by controller (600) of FIG. 1.

In state (1150), the normative operation state of the exercise machine is engaged, passing control by way of poll and/or interrupt to state (1160), to qualify sensor input as dangerous based at least in part on the data collected from the sensors (3002), and analyzing sensor data (3004). In the event an inconsistency is detected (1120)/(3006), then a brake action state (1170) is entered into and the exercise machine is stopped. A cycle count of the particular inconsistency is recorded such that minor inconsistencies may be monitored after restarting the machine. After stopping, optionally a remedy state (1180) may be entered wherein the user and/or administrator may remedy the inconsistency and return state to the operations mode (1150).

Figure 12:
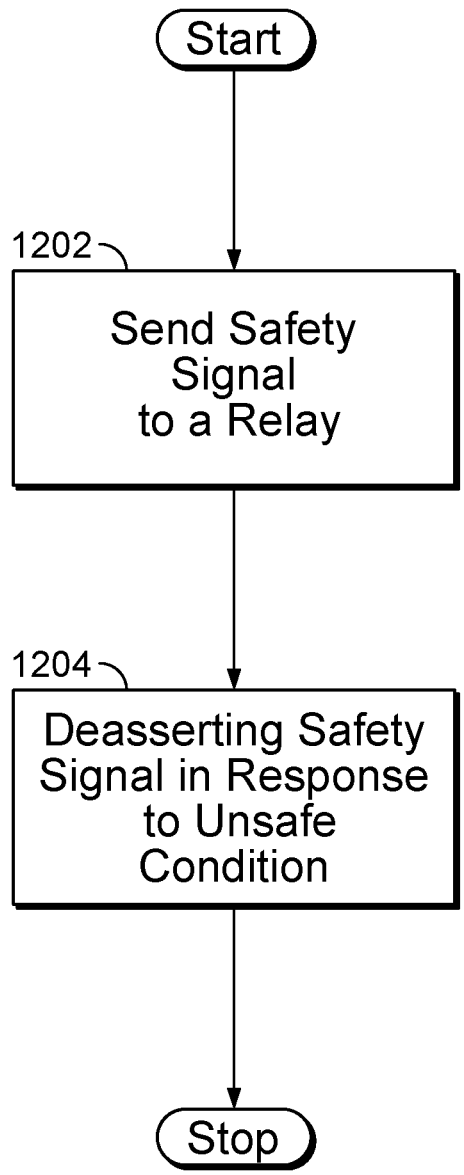
FIG. 12 is a flowchart of an embodiment of a technique for safely operating an exercise machine.

FIG. 12 is a flowchart of an embodiment of a technique for safely operating an exercise machine. In one embodiment, controller (600) of FIG. 1 carries out FIG. 12. In step (1202), a safety signal is sent to a relay coupled to a plurality of power leads of a motor wherein a default state of the relay is to short the plurality of power leads together and wherein the safety signal maintains the relay in an open state. The safety signal to the relay is deasserted in response to a determination that an unsafe condition has occurred.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An exercise machine, comprising:
a motor having a plurality of power leads; and
a relay coupled to the plurality of power leads, wherein:
a default state of the relay is to short the plurality of power leads together to cause an opposing back EMF to motion in the motor at least in part to self-brake the motor; and
the relay comprises a safety input configured to receive a safety signal to maintain the relay in an open state.

2. The exercise machine of claim 1, further comprising a safety controller coupled to the safety input.

3. The exercise machine of claim 2, further comprising a sensor coupled to the safety controller, wherein the safety controller is configured to deassert the safety signal in an event of a sensor detection from the sensor.

4. The exercise machine of claim 3, wherein the sensor detects a power failure.

5. The exercise machine of claim 3, wherein the sensor detects a memory loss and/or corruption.

6. The exercise machine of claim 3, wherein the sensor detects a motor positioning inconsistency.

7. The exercise machine of claim 3, wherein the sensor detects a motor speed inconsistency.

8. The exercise machine of claim 3, wherein the sensor detects a motor acceleration inconsistency.

9. The exercise machine of claim 3, wherein the sensor detects an electrical voltage inconsistency.

10. The exercise machine of claim 3, wherein the sensor detects an electrical current inconsistency.

11. The exercise machine of claim 3, wherein the sensor detects an electrical power inconsistency.

12. The exercise machine of claim 3, wherein the sensor detects a temperature inconsistency.

13. The exercise machine of claim 3, wherein the sensor detects a frame acceleration.

14. The exercise machine of claim 3, wherein the sensor detects an arm acceleration.

15. The exercise machine of claim 3, wherein the sensor emits a sensor failure.

16. The exercise machine of claim 3, wherein the sensor detects a watchdog timeout.

17. The exercise machine of claim 3, wherein the sensor detects a boot validation failure.

18. The exercise machine of claim 3, wherein the sensor detects an illegal instruction fault.

19. The exercise machine of claim 2, wherein the safety controller deasserts the safety signal in an event of controller failure.

20. The exercise machine of claim 2, wherein the safety controller deasserts the safety signal in event of relay failure.

21. A method of safely operating an exercise machine, comprising:

sending a safety signal to a relay coupled to a plurality of power leads of a motor wherein a default state of the relay is to short the plurality of power leads together to cause an opposing back EMF to motion in the motor at least in part to self-brake the motor and wherein the safety signal maintains the relay in an open state; and deasserting the safety signal to the relay in response to a determination that an unsafe condition has occurred.

\* \* \* \* \*